United States Patent Office 2,695,314
Patented Nov. 23, 1954

2,695,314

HYDROXYETHYLATED-N-KERYL ALKYLENEDIAMINES

Milton Kosmin, Dayton, Ohio, assignor to Monsanto Chemical Company, St. Louis, Mo., a corporation of Delaware No Drawing. Application August 25, 1951,
Serial No. 243,746

2 Claims. (Cl. 260—584)

The present invention provides a new class of surface-active compounds which is characterized by possessing high wetting-out ability.

The new compounds are addition products of certain N-kerylalkylalkylenepolyamines and ethylene oxide. The N-kerylalkylalkylenes are N-alkylalkylenepolyamines in which the alkyl radical is derived from a substantially monochlorinated kerosene fraction as disclosed in the Matthews copending application Serial No. 225,909, filed May 11, 1951, and assigned to the same assignee as is the present application. The N-kerylalkylalkylenepolyamines which react with ethylene oxide to give the present addition products have the general formula keryl—NH—R—(NH—R)$_n$—NH$_2$ in which R is an alkylene radical of from 2 to 3 carbon atoms, $n$ is 0, 1 or 2 and keryl is an alkyl radical derived from substantially mono-chlorinated kerosene. Alkylenepolyamines from which the N-alkylalkylenepolyamines are prepared are those containing at least 2 but less than 5 nitrogen atoms in the molecule, each alkylene radical of which has from 2 to 3 carbon atoms. They may be obtained by the reaction of ammonia with dihalogenated ethane or propane having the halogens on different carbon atoms, that is, not more than one halogen on any single carbon atom. Such alkylenepolyamines include ethylenediamine and propylenediamine, diethylenetriamine, triethylenetetramine, dipropylenetriamine, tripropylenetetramine, and the like. Such polyamines may also be obtained by other known methods of synthesis.

While the N-kerylalkylenepolyamines possess good surface-activity, their industrial use is somewhat limited by inadequate water-solubility. I have found however that the N-kerylalkylenepolyamines react readily with ethylene oxide to yield highly water-soluble addition products whose surface-activity, particularly with respect to wetting-out property is equal to or greater than that of the N-kerylalkylenepolyamines.

I have found that when the polyamine is contacted with only enough, or less than enough, moles of ethylene oxide to react at each of the amino hydrogens, the products are N-hydroxyethylamines of the formula

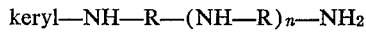

keryl—N—R—(N—R)$_n$—NY$_2$
     |         |
     Y        Y

Y is selected from the class consisting of hydrogen and the radical —CH$_2$CH$_2$OH and in which at least one Y is the radical —CH$_2$CH$_2$OH, and $n$ and keryl are as defined above.

When there is employed more than the quantity required for addition at each amino hydrogen atom, the additional moles of ethylene oxide either combine with the orginally introduced hydroxyethyl radicals to form polyethyleneglycol chains; or, if water is present at this stage of the reaction, the additional moles of ethylene oxide and the water add to the nitrogen atoms to give quaternary ammonium compounds. When the N-kerylalkylenepolyamine is N-keryldiethylenetriamine and 4 moles of ethylene oxide are used in the reaction, either in the presence or absence of water, the product has the formula:

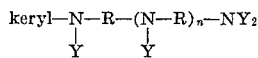

keryl—N—CH$_2$CH$_2$—N—CH$_2$CH$_2$—N—CH$_2$CH$_2$OH
      |             |              |
  CH$_2$CH$_2$OH  CH$_2$CH$_2$OH  CH$_2$CH$_2$OH The reaction may be carried out by contacting the amine with either gaseous or liquid ethylene oxide, either in the presence or absence of water, at ordinary or increased temperature until formation of the desired addition product has occurred. Generally it is preferred to control the reaction rate by gradual introduction of the ethylene oxide into the polyamine and by employing external cooling in order to maintain only moderately increased temperatures in the reaction zone. Thorough mixing of the reactants also serves to effect smooth reaction; when working with gaseous ethylene oxide such mixing may be conveniently obtained by introducing the ethylene oxide to the reaction zone through a dispersion tube.

The invention is illustrated, but not limited, by the following examples:

*Example 1*

This example shows the addition of ethylene oxide to an N-keryldiethylenetriamine which has been obtained by condensing with diethylenetriamine a substantially monochlorinated kerosene fraction (57.4% chlorinated on a molar basis, and prepared from an unchlorinated kerosene fraction boiling at about 150° C.–250° C.). A mixture of 135.0 g. (0.5 mole, based on the keryl radical as C$_{12}$) of the N-keryldiethylenetriamine and 270.0 g. of water was heated to 65° C. in a nitrogen atmosphere and into the mixture there were then passed 86 g. of ethylene oxide. During this time the temperature of the reaction mixture was maintained at 65° C. to 90° C. From the resulting aqueous product there was removed 363 g. of a sample, which upon vacuum distillation and final drying at a pot temperature of 65° C.–170° C./15–17 mm. for one hour with intermittent addition of alcohol gave 195.4 g. of the dried, liquid, N-keryl-N,N',N',N''-tetrakis(hydroxyethyl)diethylenetetramine, having the wetting-out properties shown in Example 3.

*Example 2*

To 183.0 g. (0.675 mole) of N-n-dodecyldiethylenetriamine there was gradually added 179 g. of water. A steam of ethylene oxide was then passed into the resulting mixture, and the stream continued for 5 hours, at the end of which time 119 g. of ethylene oxide had combined with the polyamine. Towards the end of the 5-hour period, a gas dispersing tube was used for introducing the ethylene oxide. The mass became hot due to the exothermic reaction heat and external cooling was employed in order to maintain the temperature of the reaction mixture at around 70° C. The product thus obtained was an aqueous solution of N-n-dodecyl-N,N',N',N'' - tetrakis(2 - hydroxyethyl)diethylenetri - amine. A sample (253 g.) of this product was removed and dried by distilling off the water, intermittent additions of ethanol being made to the distilling vessel towards the end of the distillation in order to drive off the last traces of water, and by finally maintaining the residue at a pot temperature of 40° C./19 mm. for 1.5 hours. There was thus obtained 156.5 g. of the liquid, anhydrous N-n-dodecyl-N,N',N',N''-tetrakis(2-hydroxyethyl)diethylenetriamine having the wetting-out properties shown in Example 3.

*Example 3*

The speed of wetting as measured by the Draves Test of the products of Examples 1–2 when dissolved in water to form aqueous solutions of the concentrations shown below gave the following values.

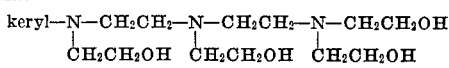

| Product tested | Speed of wetting in seconds at percent concentration | | | | |
|---|---|---|---|---|---|
| | 0.5 | 0.25 | 0.125 | 0.0625 | 0.031 |
| Example 1 | Inst. | 5.7 | 17.6 | 52.1 | 180+ |
| Example 2 | 10.2 | 18.1 | 26.9 | 93.3 | 180+ |

What I claim is:

1. A compound having the formula

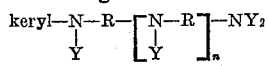

in which R is an alkylene radical of from 2 to 3 carbon radicals, Y is selected from the class consisting of hydrogen and the radical —$CH_2CH_2OH$ and in which at least one Y is —$CH_2CH_2OH$, $n$ is an integer of from 0 to 2, and keryl is an alkyl radical corresponding to the hydrocarbon residue of a chlorinated kerosene obtainable by chlorinating a kerosene fraction boiling between 150° C. to 250° C. until said kerosene is substantially mono-chlorinated on a molar basis.

2. N-keryl - N,N',N'',N''' - tetrakis(2 - hydroxyethyl)-diethylenetriamine, said keryl radical being an alkyl radical corresponding to the hydrocarbon residue of a chlorinated kerosene obtainable by chlorinating a kerosene fraction boiling between 150° C. to 250° C. until said kerosene is substantially mono-chlorinated on a molar basis.

References Cited in the file of this patent

UNITED STATES PATENTS

| Number | Name | Date |
| --- | --- | --- |
| 2,214,352 | Schoeller et al. | Sept. 10, 1940 |

FOREIGN PATENTS

| Number | Country | Date |
| --- | --- | --- |
| 454,320 | Great Britain | Sept. 24, 1936 |
| 667,744 | Germany | Nov. 19, 1938 |